United States Patent Office 2,960,108
Patented Nov. 15, 1960

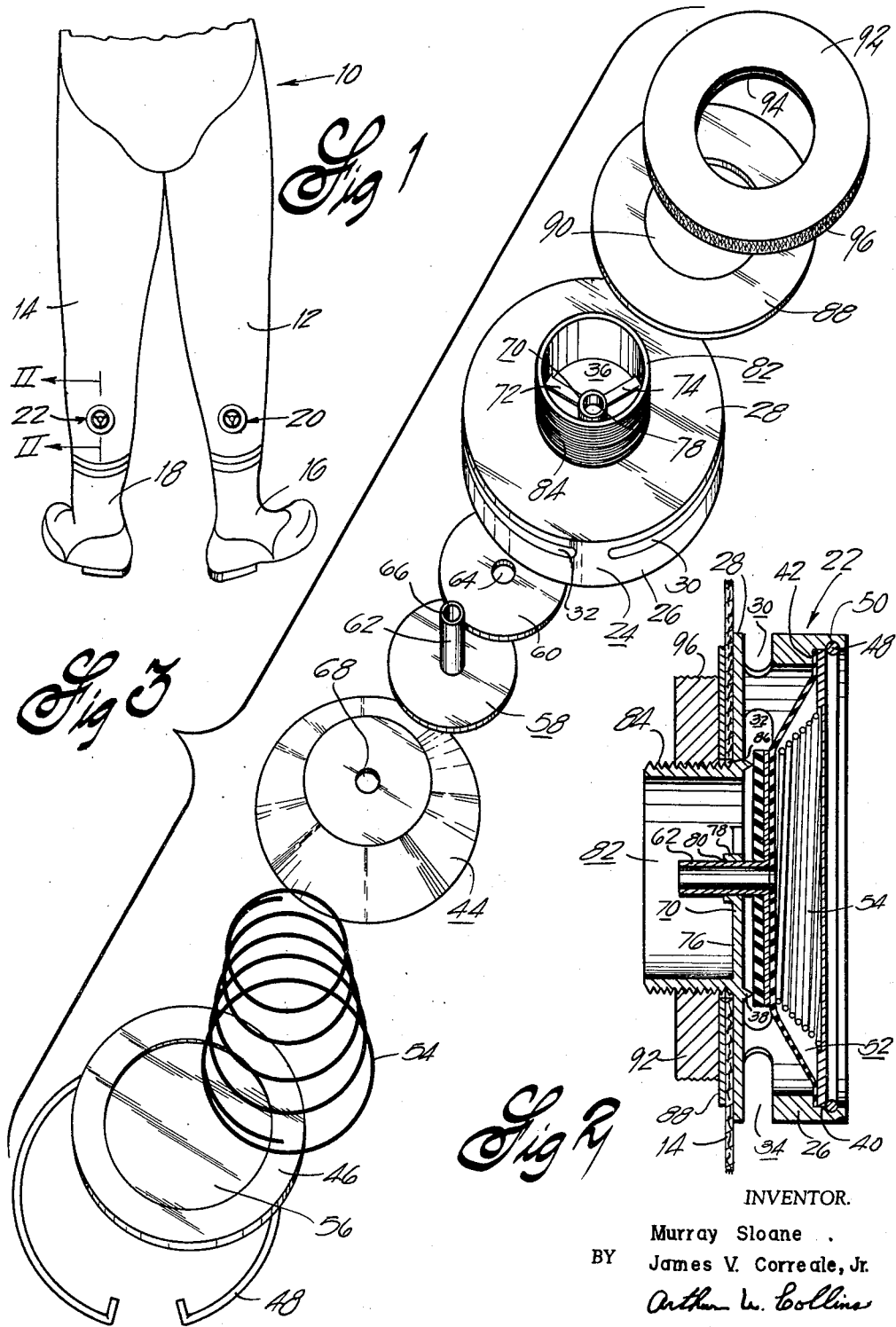

2,960,108

WATER-CHECK AIR-EXHAUST VALVE

Murray Sloane, Camden, N.J., and James V. Correale, Jr., Philadelphia, Pa., assignors to the United States of America as represented by the Secretary of the Navy Filed Apr. 17, 1959, Ser. No. 807,260

2 Claims. (Cl. 137—496)

(Granted under Title 35, U.S. Code (1952), sec. 266)

The invention described herein may be manufactured and used by or for the Government of the United States of America for governmental purposes without the payment of any royalties thereon or therefor.

This invention relates to valves and more particularly to exhaust valves for aviators' anti-exposure suits or the like.

Aviators flying aircraft over bodies of water not too infrequently find it necessary to abandon the aircraft by parachute or otherwise and remain afloat in the water for varying periods of time. Survival under these conditions obviously requires that the aviator be provided with some suitable type of anti-exposure suit, especially if the water temperatures are extremely low. Under flying conditions, however, these anti-exposure suits, due to their impermeable construction, must be supplied with ventilation air to protect and cool the body of the wearer. The amount of ventilation air required for the comfort of any given wearer may vary from time to time as flight conditions change, but the ventilation air in the suit must be maintained at substantially the same pressure in order to prevent "ballooning" or pressurization of the suit. It becomes imperative therefore that the suit be equipped with a suitable flow control means such as a valve or the like to control the exhaust of the ventilation air therefrom. When the suit becomes immersed in water, however, it also becomes imperative that the valve or flow control means provide a leak-proof closure or sealing means to prevent the flow of water into the suit.

Accordingly, one object of the present invention is to control the exhaust of ventilation air from an anti-exposure suit or the like.

Another object of the invention is to prevent the entry of water into an anti-exposure suit or the like through a ventilation-air exhaust port in the suit.

Another object of the invention is to provide an exhaust valve for an anti-exposure suit or the like which also serves as a closure means in the event the suit becomes immersed in water.

Another object of the invention is to provide an exhaust valve for an anti-exposure suit or the like which is detachably connected to the suit.

Another object of the invention is to provide a valve having a low internal resistance to fluid flow therethrough.

These and other objects of the invention will become readily apparent to those skilled in the art from the following detailed description of a preferred embodiment thereof taken in connection with the accompanying drawings, wherein:

Fig. 1 is a fragmentary end elevation of an anti-exposure suit embodying the valve of the present invention;

Fig. 2 is a section taken along the line II—II of Fig. 1; and

Fig. 3 is an exploded perspective view of the components of the valve.

Referring more particularly to Fig. 1, there is shown the lower torso portion of an anti-exposure suit or the like 10 including leg portions 12 and 14 to which are connected boot members 16 and 18, respectively. The suit 10 is preferably made of an impermeable rubberized fabric such as rubberized nylon or the like and is adapted to be supplied with ventilation air for the comfort and safety of the wearer (not shown). Ventilation air under pressure may be supplied from any suitable source (not shown) and preferably is supplied by a conduit (not shown) onnected to the head portion (not shown) of the suit 10. Ventilation air entering the head portion of the suit is circulated over the body of the wearer and is exhausted from the lower portion of the suit through a suitable valve means which in this instance takes the form of a pair of identical exhaust valves 20 and 22 constructed in accordance with the present invention. Valves 20 and 22 are carried by the suit leg portions 12 and 14 adjacent the lower extremities thereof and are adapted to be detachably connected to the suit 10 as will be discussed more in detail hereinafter.

As best seen in Figs. 2 and 3, each exhaust valve is comprised of a substantially cup-shaped casing or housing 24 defined by a side wall 26 and end or bottom wall 28. Side wall 26 is provided with three elongated slots or passages 30, 32 and 34 therein which function as an inlet means or a fluid inlet for the casing, and end wall 28 is provided with an enlarged port 36 therein which functions as an outlet means or fluid outlet for the casing. Inlet passages 30, 32 and 34 are positioned in wall 26 contiguous to casing bottom wall 28, and the outlet port 36 is concentrically positioned within casing bottom wall 28 such that the longitudinal axis of port 36 substantially coincides with the longitudinal axis of casing 24.

The inner surface of casing bottom wall 28 carries an annular, knife-edged projection 38 which serves as a valve seat. The valve seat 38 is integrally formed with casing wall 28 in this instance and is carried in close proximity to casing outlet port 36. At the "open" end of the casing 24, side wall 26 is counterbored or recessed to define a peripheral inner wall portion 40 and an annular shoulder 42.

Means responsive to changes in fluid pressure is carried within casing 24 and in this preferred embodiment of the invention assumes the form of a flexible diaphragm means or diaphragm 44. The diaphragm 44 is substantially frusto-conical in shape and preferably is made of a resilient material such as rubber or the like. Diaphragm 44 is anchored to casing 24 and is thereby fixedly retained in position therein by a closure means or annular disc 46 carried in the "open" end of the casing. The disc 46 is dimensioned to snugly engage the inner peripheral wall portion 40 of the casing and is adapted to firmly urge a margin portion of the diaphragm 44 into seating engagement with the annular shoulder 42. The annular disc 46 in turn is fixedly retained in position in the casing 24 by means of a snap-ring 48 carried within a peripheral recess 50 in casing wall portion 40. It is also preferable to use a suitable adhesive between the engaging portions of the diaphragm 44, shoulder 42 and disc 46. The use of an adhesive will not only further increase the rigidity of the connection between the marginal portion of the diaphragm 44 and the shoulder 42 and disc 46, but will also serve to provide a fluid-tight seal between the marginal portion of the diaphragm and the surfaces mating therewith.

As can readily be seen in Fig. 2, the diaphragm 44 and disc 46 connected at their marginal portions thus cooperate to form a chamber or compartment 52 within casing 24. A resilient means preferably in the form of a conical compression spring 54 is positioned within the chamber 52 and constantly urges the medial portion of the diaphragm 44 toward the valve seat 38. One end of the conical compression spring is adapted to seat on the diaphragm 44 and the opposite end thereof is adapted to bear on the disc 46. An annular recess 56 is formed in the disc 46 to provide a seat therein for the spring.

A valve member or valve member means 58 is carried by the medial portion of the diaphragm 44 and is movable thereby between open and closed positions relative to valve seat 38. The valve member 58 in this embodiment of the invention is comprised of an annular plate or disc which is preferably secured to the diaphragm 44 externally of chamber 52 by an adhesive or the like, although any other suitable connection means may be employed. The valve member 58 carries a resilient material washer or disc 60 on the face portion thereof to insure a fluid sealing engagement with the valve seat 38. The washer 60 corresponds substantially in diameter to the valve member 58 and is preferably secured thereto by a suitable adhesive, although it will also be apparent that any other suitable connection means may be employed.

Valve member 58 carries a stem or stem means 62 which in this instance is integrally formed with the valve member. The stem 62 is carried by the valve member 58 such that the longitudinal axis of the stem 62 substantially coincides with the longitudinal axis of the valve member and is movable by the valve member in opposite directions in the casing outlet 36. An aperture 64 (Fig. 3) in the washer 60 accommodates the passage of the stem 62 through the washer. It is also significant to note that the stem 62 is provided with a longitudinally extending passage means or passage 66 therein which extends the length of the stem and is adapted to register with a port means or port 68 in diaphragm 44, the port 68 being located at the approximate geometric center of the diaphragm. The stem passage 66 and diaphragm port 68 in combination provide a means for communicating with casing chamber 52 and thus establish a passageway for the entry of a second fluid such as water or the like into chamber 52, as will be discussed more in detail hereinafter in connection with the operation of the valve of the present invention.

Casing 24 carries a guide means or guide in the outlet port 36 thereof for stabilizing the movement of the stem 62. The guide means preferably takes the form of a three-armed spider member or spider generally designated by the reference numeral 70. The three arms 72, 74 and 76 of the spider 70 are integrally formed with the casing 24 in this preferred embodiment of the valve and at their inner extremities terminate in a hub or hub member 78. The hub member 78 in turn is provided with a bore 80 therein which is adapted to slidably receive and guide the movement of the stem 62 of the valve member.

Casing 24 also carries a conduit or conduit means 82 which extends substantially axially of the casing and is adapted to register with the casing outlet port 36. Conduit 82 is integrally formed with the casing bottom wall 28 in this preferred embodiment of the invention, although it will readily be appreciated that the conduit could be employed as a separate member or component and attached to the casing bottom wall 28 by any suitable means such as welding or brazing. The outer periphery of conduit 82 is provided with threads 84 thereon for a purpose to be discussed hereinafter.

In connecting or attaching the valve to the antiexposure suit 10, referring again to Figs. 1 and 2, the conduit 82 is first inserted or pushed through a port or the like 86 in the leg portion 14 of the suit with casing 24 of the valve being positioned within the interior of the suit. An annular bearing plate or washer 88 having an enlarged aperture 90 therein is then slipped over conduit 82 and brought into contact with the external surface of the suit 10. An annular retaining means or collar 92 having a threaded bore 94 therein is then screwed on the conduit 82 until the fabric of the suit 10 is tightly clamped between the bearing plate 88 and the external surface of casing bottom wall 28. The extent to which the collar 92 is screwed or tightened on conduit 82 is a matter of choice and will be determined mainly by the amount of compression of the suit fabric that is necessary to produce a fluid-tight seal between the suit aperture 86 and the casing bottom wall 28. The periphery of collar 92 is knurled at 96 to permit tightening or loosening of the collar by hand. Thus, it can readily be seen that the threaded casing conduit 82 and the bearing plate 88 and retaining collar 92 carried thereby provide a means whereby the valve can be easily connected-to and disconnected-from a suit.

The operation of the valve may be explained as follows: When the suit 10 is worn by an aviator under flying conditions, ventilation air will be supplied to the interior of the suit 10 and the ventilation air will enter the valve casing 24 through casing inlets 30, 32 and 34. The pressure of the ventilation air will act on the surface of diaphragm 44 and tend to compress or move the diaphragm toward disc 46, thereby overcoming the bias of spring 54 and moving the valve member 58 away from seat 38. The degree of opening of the valve member 58 for any given air pressure will of course be determined by the strength of spring 54 and the surface area of the diaphragm 44. For a diaphragm of a given size, therefore, it becomes an easy matter to predetermine the lift of the valve member 58 for any predetermined air pressure by merely selecting a spring having the desired strength.

With the valve member 58 moved away from the seat 38, ventilation air will flow from the interior of the suit through the casing outlet 36, thus establishing a circulation of ventilation air within the suit. If it becomes desirable for the wearer of the suit to increase the volume of ventilation air supplied to the suit, the valve member 58 will be moved further away from the seat 38 by the increased pressure acting on the diaphragm 44 to thereby increase the flow of ventilation air through casing outlet port 36. Thus, it can readily be seen that the valve member 58 acting through diaphragm 44 will automatically adjust its position in response to changes in the volume of ventilation air supplied to the suit and thereby maintain a substantially constant pressure within the suit. This automatic movement of the valve member 58 will thus prevent "ballooning" or pressurization of the suit by the ventilation air.

In the event it becomes necessary for the aviator to abandon the aircraft being flown and enter a body of water or the like, the suit will of course be removed from a source of ventilation air and the spring 54 will move the valve member 58 to the closed position. When the suit and more particularly the valve becomes submerged, water will immediately enter chamber 52 in casing 24 through the stem passage 66 and diaphragm port 68. The pressure of the water acting on valve member 52 and tending to open the valve member 58 will be opposed by the bias of spring 54 which will prevent any rapid or instantaneous opening of the valve member 58 by the water pressure and thus provide time for chamber 52 to become filled with water. When chamber 52 becomes filled, the pressure of the water therein will act on the entire inner surface of diaphragm 44 and thus yield a differential pressure which will permanently urge the valve member into engagement with seat 38. With the valve member 58 so seated, the valve thus functions as a positive closure means or seal to prevent the entry of water into the suit.

Obviously many modifications and variations of the present invention are possible in the light of the above teachings. It is therefore to be understood that within the scope of the appended claims the invention may be practiced otherwise than as specifically described.

What is claimed is:

1. A differential pressure valve for controlling the unidirectional flow of fluid comprising a cup-shaped, openended housing defined by a sidewall and a bottom wall, said housing sidewall having a plurality of fluid inlet passages therein contiguous to said bottom wall and said bottom wall being provided with an enlarged, concentrically positioned fluid outlet passage therein, said sidewall having a counterbore therein defining an annular shoulder within the open end of said housing, a substantially frusto-conical-shaped diaphragm carried within said housing with the marginal portion thereof being seated on said annular shoulder, said diaphragm having a port therein located at the approximate geometric center thereof, an annular disc carried within the open end of said housing with the peripheral portion thereof being snugly received within said counterbore and the marginal portion thereof engaging the marginal portion of said diaphragm to thereby urge said marginal portion of said diaphragm into seating engagement with said annular shoulder, said diaphragm cooperating with said annular disc to form a chamber within said housing with said port in said diaphragm communicating with said chamber, said housing sidewall having an inner peripheral recess therein within said counterbore, a snap-ring carried within said inner peripheral recess in said housing sidewall for fixedly retaining said annular disc within said counterbore to thereby urge said marginal portion of said annular disc into engagement with said marginal portion of said diaphragm and thereby urge said marginal portion of said diaphragm into sealing engagement with said annular shoulder, said housing bottom wall having an annular knife-edged projection thereon adjacent said outlet passage therein functioning as a valve seat, a valve member carried by said diaphragm and being movable thereby between open and closed flow controlling positions relative to said knife-edged valve seat in response to changes in fluid pressure acting on said diaphragm, a conical-shaped compression spring positioned within said chamber in said housing with one end thereof being seated on said annular disc and the opposite end thereof being seated on said diaphragm, said conical-shaped compression spring normally urging said diaphragm toward said housing outlet passage to thereby normally urge said valve member toward said knife-edge valve seat, a stem carried by said valve member and being movable thereby in opposite directions in said housing outlet passage upon movement of said valve member, said stem extending substantially axially of said housing outlet passage and having a passage therein comunicating with said port in said diaphragm, and a stem guide carried by said housing bottom wall and positioned within said housing outlet passage for stabilizing the movement of said stem as said valve member is moved between said open and closed position relative to said knife-edged valve seat, said passage in said stem and said port in said diaphragm providing access to said compartment within said housing whereby a second fluid entering said chamber will exert a differential pressure on said diaphragm and move said valve member into a permanently closed position relative to said knife-edge valve seat.

2. A differential pressure valve as claimed in claim 1 wherein said valve member is comprised of an annular plate and wherein a disc made of a resilient material is carried on the face of the annular plate opposite said knife-edged valve seat to thereby insure a fluid sealing engagement between said valve member and said knife-edged valve seat, said resilient-material disc having a centrally disposed port therein to accommodate the passage therethrough of said stem.

References Cited in the file of this patent

UNITED STATES PATENTS

| | | |
|---|---|---|
| 1,287,119 | Shurtleff | Dec. 10, 1918 |
| 1,772,406 | Whiton | Aug. 5, 1930 |
| 2,121,549 | McNeal | June 21, 1938 |
| 2,328,007 | Griswold | Aug. 31, 1943 |
| 2,361,786 | Morner | Oct. 31, 1944 |
| 2,401,237 | Gamble | May 26, 1946 |
| 2,449,683 | Akerman | Sept. 21, 1948 |

FOREIGN PATENTS

| | | |
|---|---|---|
| 739,717 | Germany | Oct. 2, 1943 |